United States Patent
Lee et al.

(10) Patent No.: US 9,519,487 B2
(45) Date of Patent: Dec. 13, 2016

(54) SYSTEM-ON-CHIP AND METHOD OF OPERATING THE SAME

(71) Applicant: SAMSUNG ELECTRONICS CO., LTD., Suwon-si, Gyeonggi-do (KR)

(72) Inventors: Dong-Han Lee, Seongnam-si (KR);
Sung-Chul Yoon, Hwaseong-si (KR);
Sung-Hoo Choi, Hwaseong-si (KR);
Jae-Sop Kong, Gwacheon-si (KR);
Kee-Moon Chun, Seongnam-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 374 days.

(21) Appl. No.: 14/161,838

(22) Filed: Jan. 23, 2014

(65) Prior Publication Data

US 2014/0281381 A1    Sep. 18, 2014

(30) Foreign Application Priority Data

Mar. 14, 2013 (KR) .................. 10-2013-0027486

(51) Int. Cl.
*G06F 9/38* (2006.01)
*G06F 15/78* (2006.01)
*G06F 9/30* (2006.01)

(52) U.S. Cl.
CPC ......... *G06F 9/3877* (2013.01); *G06F 15/7807* (2013.01)

(58) Field of Classification Search
None
See application file for complete search history.

(56) References Cited

U.S. PATENT DOCUMENTS

| | | |
|---|---|---|
| 6,687,769 B2 | 2/2004 | Cheung |
| 7,171,542 B1 | 1/2007 | Alfano et al. |
| 7,622,963 B2 | 11/2009 | Westwick |
| 7,913,012 B2 | 3/2011 | Piasecki et al. |
| 8,023,557 B2 | 9/2011 | Constantinidis et al. |
| 8,065,455 B2 | 11/2011 | Hilscher |
| 2004/0177176 A1* | 9/2004 | Li .................. G06F 13/4208 710/33 |
| 2007/0159490 A1 | 7/2007 | DeGreef |

(Continued)

FOREIGN PATENT DOCUMENTS

| | | |
|---|---|---|
| JP | 61-018235 | 1/1986 |
| KR | 1020060064146 | 6/2006 |

*Primary Examiner* — Scott Sun
(74) *Attorney, Agent, or Firm* — F. Chau & Associates, LLC

(57) ABSTRACT

A system-on-chip (SoC) includes a slave intellectual property (IP) block, a master IP block, and an update control unit. The slave IP block is configured to perform first processing on first data based on first control information stored in a first storage unit. The master IP block is configured to perform second processing on second data in response to receiving a first processing result obtained by performing the first processing on the first data. Performing the second processing is based on second control information stored in a second storage unit. The update control unit is configured to determine an update time of the first control information or an update time of the second control information in response to performing the first processing and performing the second processing.

14 Claims, 17 Drawing Sheets

(56) References Cited

U.S. PATENT DOCUMENTS

2008/0320277 A1* 12/2008 Fish, III .............. G09F 9/30032
                                                          712/28
2011/0242412 A1    10/2011 Lee et al.
2012/0054379 A1     3/2012 Leung et al.

* cited by examiner

SYSTEM-ON-CHIP AND METHOD OF OPERATING THE SAME

CROSS-REFERENCE TO RELATED APPLICATIONS

This application claims priority under 35 U.S.C. §119 to Korean Patent Application No. 10-2013-0027486, filed on Mar. 14, 2013, the disclosure of which is incorporated by reference herein in its entirety.

TECHNICAL FIELD

Exemplary embodiments of the present inventive concept relate to a system-on-chip and a method of operating the same, and more particularly, to a system-on-chip that may provide a fast and accurate response to an external request, and a method of operating the same.

DISCUSSION OF THE RELATED ART

As the use of system-on-chips (SoCs) in electronic devices increases, the processing requirements of SoCs such as, for example, speed and accuracy requirements relating to operations of SoCs, also increase.

SUMMARY

Exemplary embodiments of the present inventive concept provide a system-on-chip (SoC) that may process a required operation in a fast and accurate manner, and a method of operating the same.

According to an exemplary embodiment of the present inventive concept, an SoC includes a slave intellectual property (IP) block for performing first processing on data based on first control information stored in a first storage unit of the slave IP block, a master IP block performing second processing by receiving a result obtained by performing first processing on the data based on second control information stored in a second storage unit of the master IP block, and an update control unit for determining an update time of first control information stored in the first storage unit, or an update time of second control information stored in the second storage unit, according to the first processing and the second processing performed on the data.

According to an exemplary embodiment of the present inventive concept, an electronic system including a plurality of functional blocks connected to a bus includes a first functional block including a first update control unit for updating first control information stored in a first storage unit according to a result obtained by performing first processing on first data based on the first control information stored in the first storage unit among the plurality of functional blocks, and a second functional block including a second update control unit for updating second control information stored in a second storage unit according to a result obtained by performing second processing on second data based on the second control information stored in the second storage unit among the plurality of functional blocks. Each of the first update control unit and the second update control unit determines update times of the first control information and the second control information according to a correlation between the result obtained by performing the first processing on the first data and the result obtained by performing the second processing on the second data.

According to an exemplary embodiment of the present inventive concept, a method of operating an SoC includes processing data based on control information stored in a storage unit, wherein an optional functional block performs the processing, and updating the control information according to a result obtained by processing the data, wherein the optional functional block performs the updating. Determining the result obtained by processing the data is correlated to a result obtained by processing the data in another functional block, and the optional functional block performs the determining. When it is determined that the result obtained by processing the data is correlated to the result obtained by processing the data in the other functional block, synchronizing the updating of the control information in the optional functional block and updating the control information in the other functional block may be performed.

According to an exemplary embodiment of the present inventive concept, there is provided a computer readable recording medium storing a program for executing the above method.

According to an exemplary embodiment of the present inventive concept, an SoC includes a first slave intellectual property (IP) block configured to perform first processing on first data based on first control information stored in a first storage unit of the first slave IP block, a master IP block configured to perform second processing on second data in response to receiving a first processing result obtained by performing the first processing on the first data, wherein performing the second processing is based on second control information stored in a second storage unit of the master IP block, and an update control unit configured to determine an update time of the first control information stored in the first storage unit or an update time of the second control information stored in the second storage unit, in response to performing the first processing on the first data and performing the second processing on the second data.

According to an exemplary embodiment of the present inventive concept, an electronic system includes a first functional block including a first update control unit, wherein the first update control unit is configured to update first control information stored in a first storage unit according to a first result obtained by performing first processing on first data based on the first control information, and a second functional block including a second update control unit, wherein the second update control unit is configured to update second control information stored in a second storage unit according to a second result obtained by performing second processing on second data based on the second control information. The first update control unit and the second update control unit are configured to determine update times of the first control information and the second control information according to a correlation between the first result and the second result.

According to an exemplary embodiment of the present inventive concept, a method of operating an SoC includes processing data, by a first functional block, based on first control information stored in a storage unit, and updating the first control information, by the first functional block, according to a first result obtained by processing the data. Updating the first control information includes determining, by the first functional block, whether the first result obtained by processing the data is correlated with a second result obtained by processing the data in a second functional block, and synchronizing updating the first control information in the functional block and updating second control information in the second functional block upon determining that the first result is correlated with the second result.

According to an exemplary embodiment of the present inventive concept, a method of operating an SoC includes performing first processing on first data, by a slave intellectual property (IP) block, based on first control information stored in a first storage unit of the slave IP block, performing second processing on second data, by a master IP block, in response to receiving a first processing result obtained by performing the first processing on the first data, wherein performing the second processing is based on second control information stored in a second storage unit of the master IP block, and determining an update time of the first control information or an update time of the second control information in response to performing the first processing on the first data and performing the second processing on the second data.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
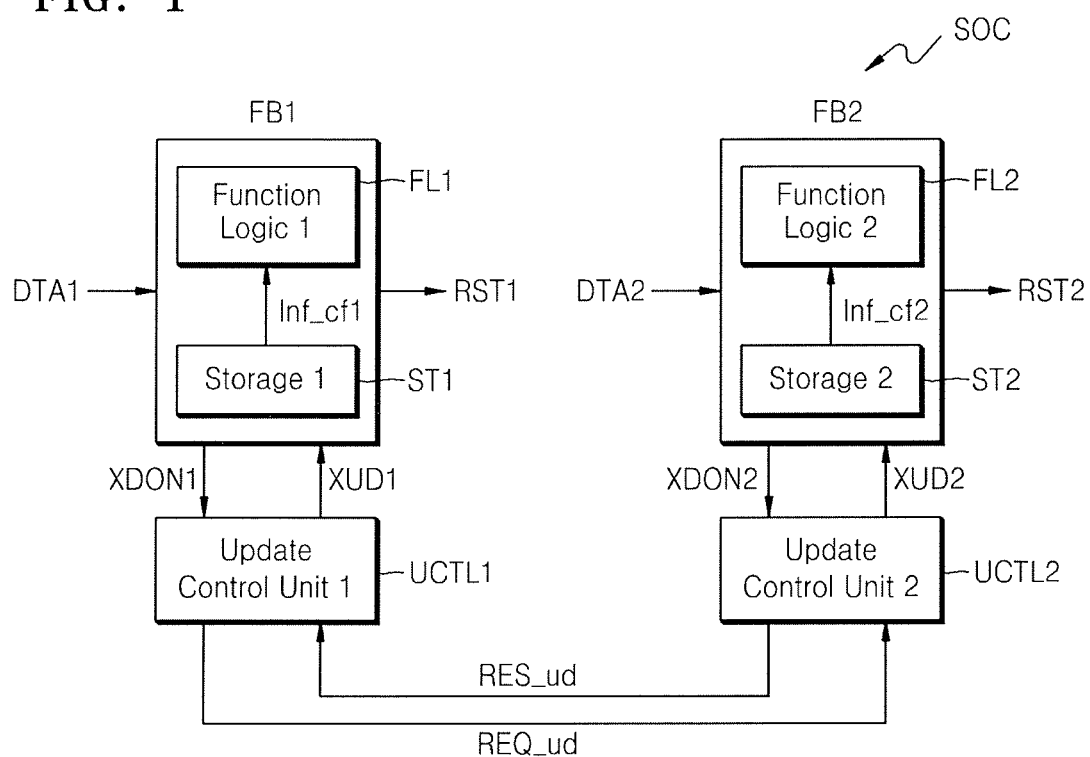
FIG. 1 is a block diagram of a system on-chip (SoC), according to an exemplary embodiment of the present inventive concept.

Exemplary embodiments of the present inventive concept will be described more fully hereinafter with reference to the accompanying drawings. Like reference numerals may refer to like elements throughout the accompanying drawings.

FIG. 1 is a block diagram of a system on-chip (SoC), according to an exemplary embodiment of the present inventive concept.

Referring to FIG. 1, according to an exemplary embodiment, the SoC includes a first update control unit UCTL1 and a second update control unit UCTL2. The first update control unit UCTL1 controls updating of first control information Inf_cf1 in a first functional block FB1. The second update control unit UCTL2 controls updating of second control information Inf_cf2 in a second functional block FB2. For example, the first update control unit UCTL1 and the second update control unit UCTL2 respectively determine the first control information Inf_cf1 and the second control information Inf_cf2 according to a correlation between a first result RST1 obtained by processing first data DTA1, and a second result RST2 obtained by processing second data DTA2. This process will be described further below.

The first functional block FB1 includes a first storage unit ST1 that stores the first control information Inf_cf1. The first functional block FB1 processes the first data DTA1 in response to an external request based on the first control information Inf_cf1 stored in the first storage unit ST1. For example, if a requested operation of the first functional block FB1 is a request to perform color compensation for the first data DTA1 (e.g., image data in the current example), the first functional block FB1 may process the color compensation request and perform color compensation based on the first control information Inf_cf1, which may include parameters regarding the color compensation request. For convenience of explanation, the operation of the first functional block FB1, for example, processing of the first data DTA1, may be referred to herein as first processing. Further, for convenience of explanation, exemplary embodiments described herein may refer to first and/or second data DTA1 and DTA2 as being image data, and may refer to a color compensation operation being performed on first and/or second data DTA1 and DTA2. However, it is to be understood that exemplary embodiments are not limited to image data and color compensation operations.

The first processing of the first functional block FB1 may be performed in a first functional logic unit FL1 included in the first functional block FB1. The first functional logic unit FL1 may generate the result RST1 obtained by processing the first data DTA1. The first functional block FB1 may output the result RST1. However, as will be described below, when the result RST1 obtained by processing the first data DTA1 affects only the first functional block FB1, the result RST1 obtained by processing the first data DTA1 may not be output outside the first functional block FB1. Alternatively, only information regarding whether the first data DTA1 has been completely processed may be provided outside the first functional block FB1 (e.g., to a processor of FIG. 6, as described below) to request processing of the first data DTA1. This may also apply to other functional blocks that are further described below.

Similarly, the second functional block FB2 includes a second storage unit ST2 that stores the second control information Inf_cf2. The second functional block FB2 processes the second data DTA2 in response to an external request based on the second control information Inf_cf2 stored in the second storage unit ST2. Processing of the second data DTA2 based on the second control information Inf_cf2 may be similar to the above-described operation with respect to the first functional block FB1.

For convenience of explanation, the operation of the second functional block FB2, for example, processing of the second data DTA2, may be referred to herein as second processing. The second processing of the second functional block FB2 may be performed in a second functional logic unit FL2 included in the second functional block FB2. The second functional logic unit FL2 may generate the result RST2 obtained by processing the second data DTA2. The second functional block FB2 may output the result RST2.

When the first processing result RST1 is generated, a first complete signal XDON1 regarding completion of the first processing of the first data DTA1 may be provided to the first update control unit UCTL1. When the second processing result RST2 is generated, a second complete signal XDON2 regarding completion of the second processing of the second data DTA2 may be provided to the second update control unit UCTL2.

When the first complete signal XDON1 is input to the first update control unit UCTL1, the first update control unit UCTL1 may control an update time of the first control information Inf_cf1. When the second complete signal XDON2 is input to the second update control unit UCTL2, the second update control unit UCTL2 may control an update time of the second control information Inf_cf2. When the update time of the first control information Inf_cf1 is determined, the first update control unit UCTL1 may instruct that the first control information Inf_cf1 be updated using the first complete signal XDON1. When the update time of the second control information Inf_cf2 is determined, the second update control unit UCTL2 may instruct that the second control information Inf_cf2 be updated using the second complete signal XDON2.

As described above, according to the correlation between the result RST1 obtained by processing the first data DTA1 and the result RST2 obtained by processing the second data DTA2, an update time of the first control information Inf_cf1 and the second control information Inf_cf2 may be determined. For example, when the first processing result RST1 affects only the first functional block FB1, for example, when the first processing result RST1 does not affect another functional block (e.g., the second functional block FB2), the result RST1 obtained by processing the first data DTA1 and the result RST2 obtained by processing the second data DTA2 are correlated to each other. An example of a first processing result RST1 that does not affect another functional block is a change in an address of a frame buffer used only in the first functional block FB1.

When the first processing result RST1 is a result obtained by minimizing or reducing a size of the first data DTA1, and the second processing result RST2 is a result obtained by performing, for example, color compensation processing on the second data DTA2 by receiving the first processing result RST1 as the second data DTA2, the first processing result RST1 and the second processing result RST2 are correlated to each other. For example, when the second functional block FB2 receives the first processing result RST1 and performs color compensation processing, a size of the second data DTA2 should be reduced.

The first control information Inf_cf1 stored in the first storage unit ST1, corresponding to the result RST1 obtained by processing the first data DTA1, should be updated. Similarly, the second control information Inf_cf2 stored in the second storage unit ST2, corresponding to the result RST2 obtained by processing the second data DTA2, should also be updated. In this regard, when processing of the above-described different functional blocks is correlated, updating of the first control information Inf_cf1 and the second control information Inf_cf2 should be synchronized.

To accomplish synchronization, according to exemplary embodiments, the first update control unit UCTL1 and the second update control unit UCTL2 may communicate with each other to control the update time of the first control information Inf_cf1 and the second control information Inf_cf2. FIG. 1 shows an example in which the first update control unit UCTL1 transmits an update instruction request REQ_ud to the second update control unit UCTL2, and the second update control unit UCTL2 transmits an update instruction response RES_ud for controlling the update time of the first control information Inf_cf1 to the first update control unit UCTL1 in response to the update instruction request REQ_ud.

Although the first processing result RST1 from the first functional block FB1 and the update instruction request REQ_ud and the update instruction response RES_ud between the first functional block FB1 and the second functional block FB2 are transmitted and received through different lines in FIG. 1, exemplary embodiments are not limited thereto. For example, these signals may be transmitted or received through the same line, or the signals may be grouped together in different combinations and transmitted via two or more lines.

Exemplary embodiments of the present inventive concept provide a structure and an operation for improving the synchronization of updating control information when the processing of different functional blocks is correlated. Various examples of the SoC of FIG. 1 will be described herein.

Figure 2:
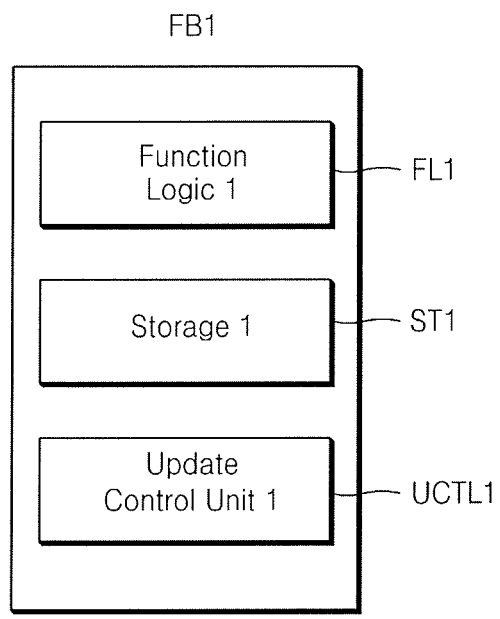
FIG. 2 is a block diagram of an update control unit of FIG. 1 included in a functional block, according to an exemplary embodiment of the present inventive concept.
Figure 5:
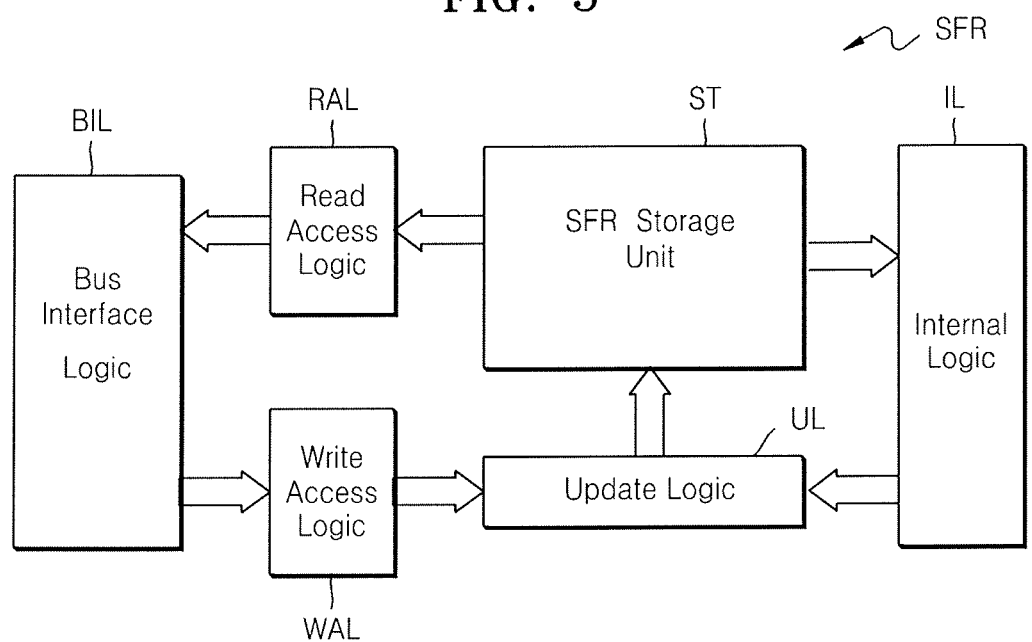
FIG. 5 is a block diagram of a special function register (SFR) of FIG. 4, according to an exemplary embodiment of the present inventive concept.

Referring to FIG. 1, the first update control unit UCTL1 and the second update control unit UCTL2 are shown as being disposed outside of the first functional block FB1 and the second functional block FB2, respectively. However, exemplary embodiments are not limited thereto. For example, as shown in FIG. 2, the first update control unit UCTL1 may be included in the first functional block FB1. For example, the first update control unit UCTL1 may be included in an update logic unit UL that is included in the first storage unit ST1 of the first functional block FB1, as shown in FIG. 5. Similarly, the second update control unit UCTL2 may be included in the second functional block FB2.

Figure 3:
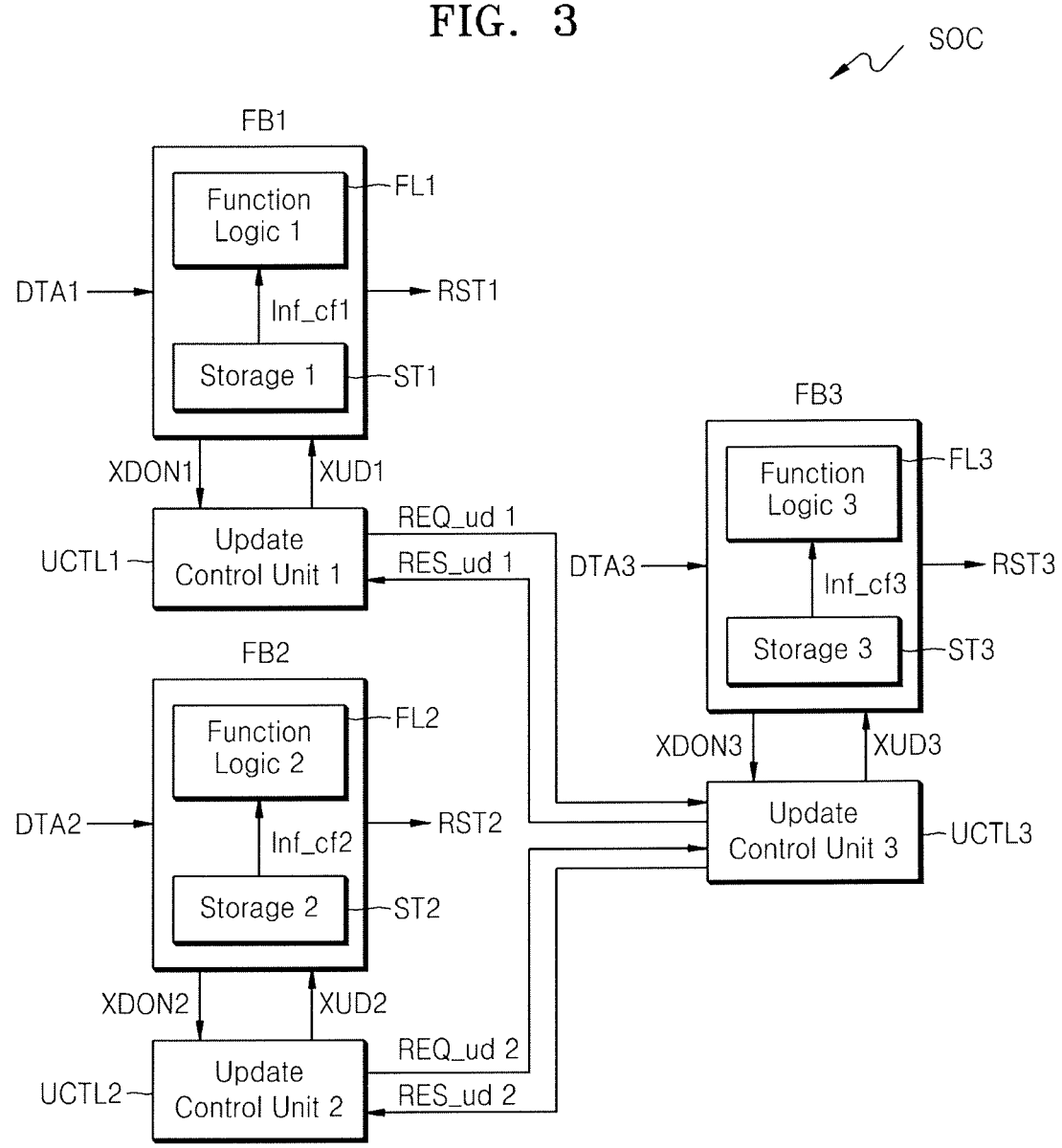
FIG. 3 is a block diagram of the SoC of FIG. 1 further including a third functional block, according to an exemplary embodiment of the present inventive concept.

Referring to FIG. 1, the SoC of FIG. 1 includes two functional blocks. However, exemplary embodiments are not limited thereto. For example, as shown in FIG. 3, the SoC according to an exemplary embodiment may further include a third functional block FB3.

The third functional block FB3 may include a third storage unit ST3 that stores third control information Inf_cf3. The third functional block FB3 processes third data DTA3 in response to an external request based on the third control information Inf_cf3 stored in the third storage unit ST3. Processing of the third data DTA3 based on the third control information Inf_cf3 may be similar to the above-described operation of the first functional block FB1 or the second functional block FB2. For convenience of explanation, an operation of the third functional block FB3, for example, the processing of the third data DTA3, may be referred to herein as third processing. The third processing of the third functional block FB3 may be performed in a third functional logic unit FL3 included in the third functional block FB3. The third functional logic unit FL3 may generate a third processing result RST3 obtained by processing the third data DTA3. The third functional block FB3 may output the third processing result RST3. A third update control unit UCTL3 controls updating of the third control information Inf_cf3 that is the basis of third processing in the third functional block FB3.

Similar to the above-described first update control unit UCTL1 and second update control unit UCTL2, the third update control unit UCTL3 may differently control an update time of the third control information Inf_cf3 according to a correlation between the third processing result RST3 and the first processing result RST1 or the second processing result RST2. An example of the operation of the third update control unit UCTL3 will be described further below.

Figure 4:
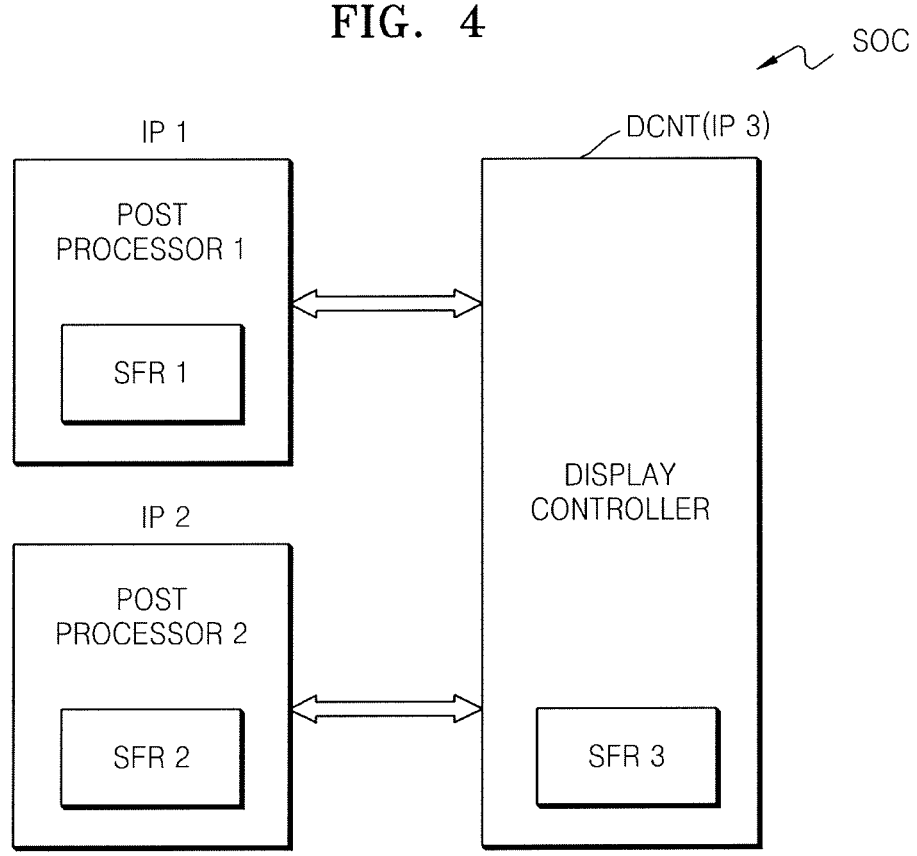
FIG. 4 is a block diagram of a multimedia device that is formed using the SoC of FIG. 1, according to an exemplary embodiment of the present inventive concept.

FIG. 4 is a block diagram of a multimedia device formed using the SoC of FIG. 1, according to an exemplary embodiment of the present inventive concept.

Referring to FIGS. 1 and 4, the SoC of FIG. 1 may be the multimedia device of FIG. 4. For example, the SoC of FIG. 4 may be a multimedia device that processes data firstly or secondly, and displays the data in a 3-dimensional (3D) image. For example, the SoC of FIG. 4 may be the multimedia device that firstly processes one piece of image data at an angle of a user's left eye (e.g., left-eye data), and secondly processes the image data at an angle of a user's right eye to generate the 3D image (e.g., right-eye data). However, the multimedia device is not limited thereto.

For example, the first functional block FB1 and the second functional block FB2 of FIG. 1 may be the first intellectual property (IP) block IP1 and the second IP block IP2 of FIG. 4, respectively. An IP block is a circuit component used in the SoC, and may be, for example, a microprocessor, a memory, a peripheral component interconnect (PCI) device, a universal serial bus (USB) device, a media access control (MAC) device, etc. The SoC may include a plurality of IP blocks that may be connected using various methods to support various functions. For example, referring to a multimedia device, a multimedia device may include a plurality of IP blocks to provide a seamless result to a user by performing data processing via the plurality of IP blocks. The plurality of IP blocks may be closely connected according to a data flow between the plurality of IP blocks.

The first IP block IP1 and the second IP block IP2 of FIG. 4 may be, for example, post processors that post-process image data. A post processor may be a processor that performs the above-described color compensation process or a resizing process on an image. However, the post processor is not limited thereto. The first IP block IP1 and the second IP block IP2 of FIG. 4 may respectively perform first processing and second processing under the control of a display controller DCNT, similar to the first functional block FB1 and the second functional block FB2 of FIG. 1. Alternatively, the first IP block IP1 and the second IP block IP2 of FIG. 4 may respectively transmit results obtained by performing first processing and second processing to the display controller DCNT, similar to the first functional block FB1 and the second functional block FB2 of FIG. 1. The display controller DCNT may be a third IP block IP3 of the SoC of FIG. 4. The third IP block IP3 may be the above-described third functional block FB3 of FIG. 3.

Thus, the first IP block IP1 through the third IP block IP3 of FIG. 4 may respectively include the first through third storage units ST1, ST2, and ST3 of FIG. 3. The first IP block IP1 through the third IP block IP3 of FIG. 4 may include the first through third storage units ST1, ST2, and ST3 as special function registers SFR1 through SFR3.

FIG. 5 is a block diagram of an SFR of FIG. 4, according to an exemplary embodiment of the present inventive concept.

Referring to FIG. 5, the SFR may include an SFR storage unit ST that stores control information, a read access logic unit RAL that reads the control information from the SFR storage unit ST, a write access logic unit WAL that writes the control information to the SFR storage unit ST, a bus interface logic unit BIL that transmits and receives control information, and an internal logic unit IL that performs an operation using the control information stored in the SFR storage unit ST, and an update logic unit UL. The control information described with reference to FIG. 5 may be one of the above-described first control information Inf_cf1 through the third control information Inf_cf3.

Figure 6:
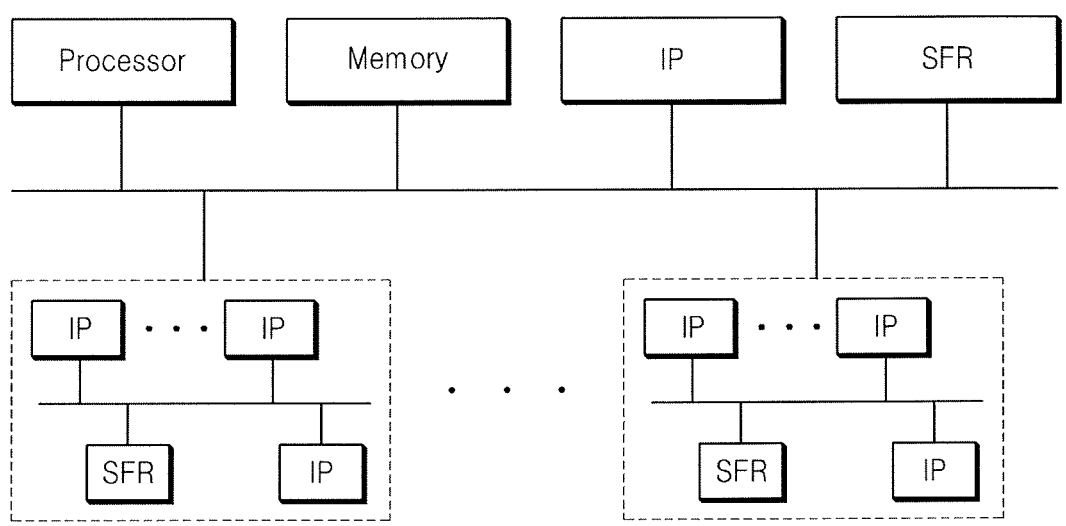
FIG. 6 is a block diagram of an electronic system including the SoC of FIG. 1, according to an exemplary embodiment of the present inventive concept.

The SoC of FIG. 1, 3 or 4 may be included in an electronic system ESYS as shown in FIG. 6.

The electronic system ESYS of FIG. 6 may include a processor, a memory, a plurality of functional blocks (e.g., IP blocks), and an SFR that are connected to a bus. The processor may control the plurality of functional blocks in response to a user request input to the electronic system ESYS. The memory may store data of which processing is requested from, or data processed by the plurality of functional blocks. In an exemplary embodiment, the SFR may be independently provided from the plurality of functional blocks. An optional functional block among the plurality of functional blocks may include a plurality of sub-functional blocks and an SFR connected to a local bus within a block (e.g., as indicated by a dotted line in FIG. 6). Similar to the functional blocks according to an exemplary embodiment of the present inventive concept, updating of control information of the sub-functional blocks may be synchronized when processing of the sub-functional blocks is correlated. In addition to the bus, local signal lines may be provided between the functional blocks, and various signals relating to the update synchronization may be transmitted through the local signal lines.

As described above, the SoC according to an exemplary embodiment of the present inventive concept may be implemented in various forms. A method of controlling an update time of the control information described with reference to the SoC according to an exemplary embodiment of the present inventive concept will be described herein using signals used to control updating of the control information.

Figure 7:
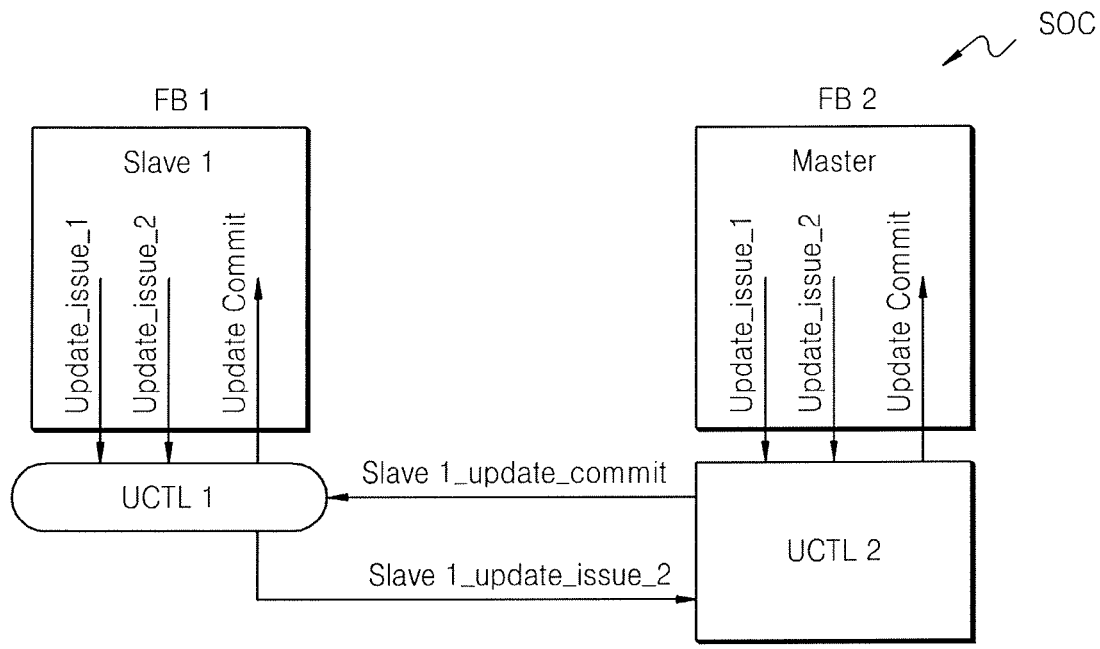
FIG. 7 is a diagram of an example of signals used to control the updating of control information in the SoC of FIG. 1, according to an exemplary embodiment of the present inventive concept.

FIG. 7 is a diagram of signals used to control the updating of control information in the SoC of FIG. 1, according to an exemplary embodiment of the present inventive concept.

Referring to FIGS. 1 and 7, a first slave IP block FB1 and a master IP block FB2 of FIG. 7 may be the first functional block FB1 and the second functional block FB2 of FIG. 1.

The first slave IP block FB1 and the master IP block FB2 may be respectively used as the first functional block FB1 and the second functional block FB2 below.

The first slave IP block FB1 may transmit the first processing result RST1 with regard to the first data DTA1 to the master IP block FB2. The master IP block FB2 may receive the first processing result RST1 from the first slave IP block FB1 as the second data DTA2, and may perform second processing on the second data DTA2. First processing and second processing may be performed asynchronously in the first slave IP block FB1 and the master IP block FB2, respectively. Herein, a slave IP block may be an IP block providing data (e.g., a processing result), and a master IP block may be an IP block receiving the data (e.g., the processing result).

A relationship between the slave IP block and the master IP block may be defined by software or an application loaded to the memory of FIG. 6. A flow of the data (e.g., the processing result) from the slave IP block to the master IP block may be controlled by the processor of FIG. 6. However, the slave IP block and the master IP block may not always have a relationship of providing and receiving the data (e.g., the processing result). As described above, a processing result of the slave IP block may affect only the slave IP block. In this case, the corresponding processing result may not be transmitted to the master IP block.

Referring to FIGS. 1 and 7, the first update control unit UCTL1 and the second update control unit UCTL2 of FIG. 7 may be the first update control unit UCTL1 and the second update control unit UCTL2 of FIG. 1, respectively. Herein, the first update control unit UCTL1 may be referred to as a slave update control unit, and the second update control unit UCTL2 may be referred to as a master update control unit. The first update control unit UCTL1 and the second update control unit UCTL2 may use a first update issue signal Update_issue_1, a second update issue signal Update_issue_2, and an update execution signal Update_Commit that are transmitted or received to or from the first slave IP block FB1 and the master IP block FB2 to control update times of the first control information Inf_cf1 of the first slave IP block FB1 and the second control information Inf_cf2 of the master IP block FB2. The first update issue signal Update_issue_1 and the second update issue signal Update_issue_2 transmitted to the first update control unit UCTL1 are the first complete signals XDON1 of FIG. 1, and the update execution signal Update_Commit received by the first update control unit UCTL1 is a first update execution signal XUD1 of FIG. 1. The first update issue signal Update_issue_1 and the second update issue signal Update_issue_2 transmitted to the second update control unit UCTL2 are the second complete signals XDON2 of FIG. 1, and the update execution signal Update_Commit received by the second update control unit UCTL2 is a second update execution signal XUD2 of FIG. 1.

As described above, the first update control unit UCTL1 and the second update control unit UCTL2 may be respectively included in the first slave IP block FB1 and the master IP block FB2. Thus, that the first update control unit UCTL1 and the second update control unit UCTL2 transmit or receive signals to or from the first slave IP block FB1 and the master IP block FB2, respectively, does not necessarily mean that the first update control unit UCTL1 and the second update control unit UCTL2 are physically separated from the first slave IP block FB1 and the master IP block FB2, respectively. Rather, this may mean that the first update control unit UCTL1 and the second update control unit UCTL2 transmit or receive signals to or from a specific logic unit (for example, the first functional logic unit FL1 of FIG. 1) and the second functional logic unit FL2 or the update logic unit UL of FIG. 5 of the first slave IP block FB1 and the master IP block FB2, respectively.

To control update times of the first control information Inf_cf1 of the first slave IP block FB1 and the second control information Inf_cf2 of the master IP block FB2, the first update control unit UCTL1 and the second update control unit UCTL2 may transmit or receive a first slave update issue signal Slave1_update_issue_2 and a first slave update execution signal Slave1_Update_Commit to or from each other. The first slave update issue signal Slave1_update_issue_2 transmitted from the first slave IP block FB1 to the master IP block FB2 may be the update instruction request REQ_ud of FIG. 1. The first slave update execution signal Slave1_Update_Commit transmitted from the master IP block FB2 to the first slave IP block FB1 may be the update instruction response RES_ud of FIG. 1.

A flow of each signal of FIG. 7 will be described herein using various examples. Exemplary embodiments are not limited by the examples described herein.

Figure 8:
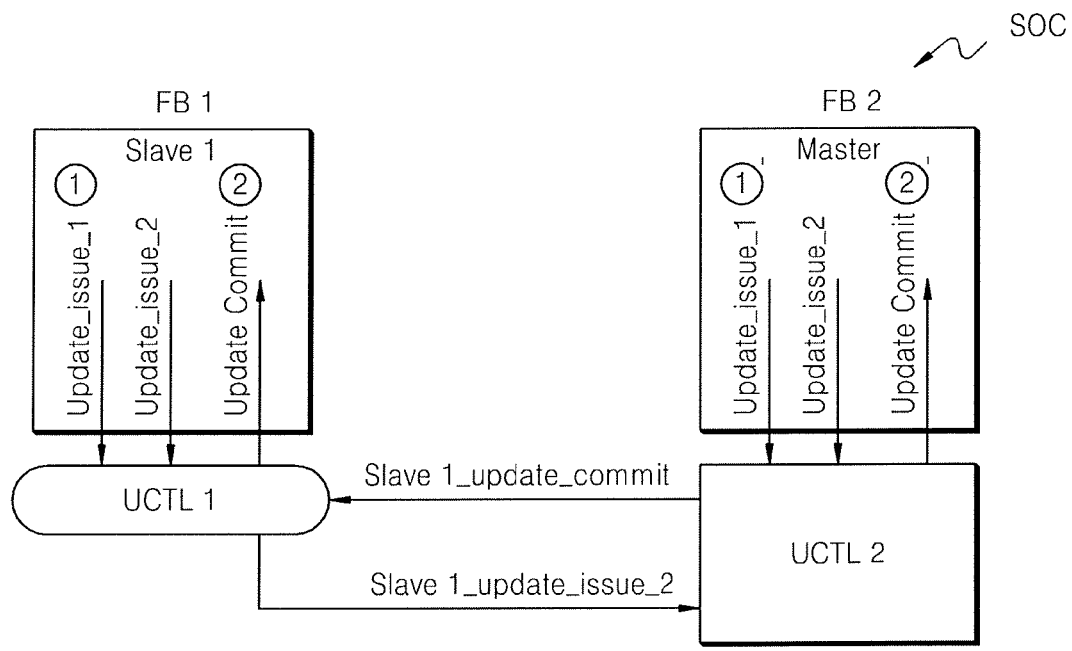
FIGS. 8 and 9 are signal flow diagrams showing signals of FIG. 7, according to exemplary embodiments of the present inventive concept.
Figure 9:
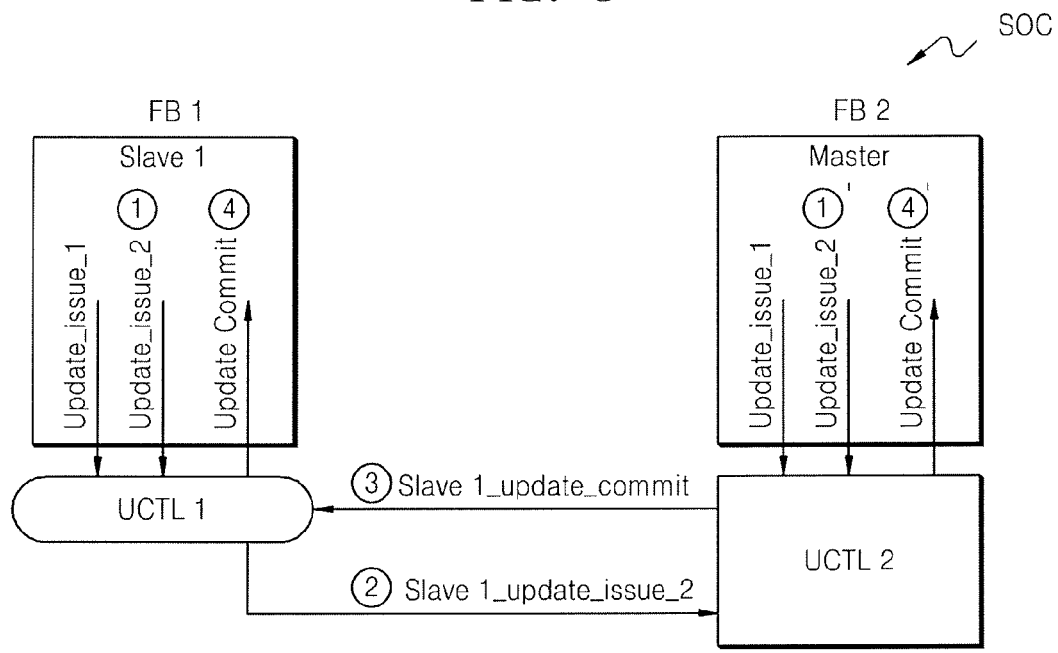

FIGS. 8 and 9 are signal flow diagrams showing the signals of FIG. 7, according to exemplary embodiments of the present inventive concept.

Referring to FIGS. 1 and 8, when first processing on the first data DTA1 of the first slave IP block FB1 affects only the first slave IP block FB1, and does not affect the master IP block FB2 (e.g., when the first processing on the first data DTA1 is a change in an address of a frame buffer used only in the first slave IP block FB1), the first update control unit UCTL1 may not communicate with the second update control unit UCT2, and may update the first control information Inf_cf1 stored in the first storage unit ST1.

For example, when the first update control unit UCTL1 receives the first update issue signal Update_issue_1 from the first slave IP block FB1 (①), the first update control unit UCTL1 may transmit the update execution signal Update_Commit instructing the first slave IP block FB1 (②) to update the first control information Inf_cf1. In this regard, the first functional logic unit FL1 of the first slave IP block FB1 performs the first processing that affects only the first slave IP block FB1, and then may transmit the first update issue signal Update_issue_1 to the first update control unit UCTL1. The first storage unit ST1 of the first update control unit UCTL1 may transmit the update execution signal Update_Commit to, for example, the update logic unit UL of the SFR of FIG. 5.

Similarly, when the second update control unit UCTL2 performs second processing that affects only the master IP block FB2 and receives the first update issue signal Update_issue_1, the second update control unit UCTL2 may independently determine the update time of the second control information Inf_cf2.

Referring to FIGS. 1 and 9, when the first processing on the first data DTA1 of the first slave IP block FB1 affects the second processing performed on the second data DTA2 of the master IP block FB2, for example, when the master IP block FB2 receives the first processing result RST1 obtained by reducing a size of the first data DTA1 (e.g., frame data from the slave IP block FB1) as the second data DTA2 and performs the second processing, the first update control unit UCTL1 may update the first control information Inf_cf1 stored in the first storage unit ST1 under the control of the second update control unit UCTL2. As a result, the updating of the first control information Inf_cf1 and the second control information Inf_cf2 may be synchronized.

For example, when the first update control unit UCTL1 receives the second update issue signal Update_issue_2 from the first slave IP block FB1 (①), the first update control unit UCTL1 may transmit the first slave update issue signal Slave1_update_issue_2 to the second update control unit UCTL2 (②) to request an instruction to update the first control information Inf_cf1. In this regard, the first functional logic unit FL1 of the first slave IP block FB1 performs the first processing that affects the first slave IP block FB1 and the master IP block FB2, and then may transmit the second update issue signal Update_issue_2 to the first update control unit UCTL1.

Determining whether the first processing affects another IP block may be based on, for example, properties of the first data DTA1, an external request corresponding to the first data DTA1, or provided information regarding whether the first processing affects another IP block. Providing of the information regarding whether the first processing affects another IP block may be performed by the processor or the SFR of FIG. 6.

When the second update control unit UCTL2 receives the second update issue signal Update_issue_2 indicating completion of the second processing related to the first processing of another IP block (e.g., the first slave IP block FB1) from the master IP block FB2 (①'), and receives the first slave update issue signal Slave1_update_issue_2 from the first update control unit UCTL1 (②), the second update control unit UCTL2 may transmit the update execution signal Update_Commit instructing that the second control signal information Inf_cf2 be updated to the master IP block FB2 (③), and may transmit the first slave update execution signal Slave1_Update_Commit to the first update control unit UCTL1 (③). When the first update control unit UCTL1 receives the first slave update execution signal Slave1_Update_Commit from the second update control unit UCTL2 to instruct that the first control information Inf_cf1 (③) be updated, the first update control unit UCTL1 may transmit the update execution signal Update_Commit instructing the first slave IP block FB1 (④) to update the first control information Inf_cf1.

Thus, according to the SoC of an exemplary embodiment, although the first slave IP block FB1 and the master IP block FB2 operate asynchronously, updating of the first control information Inf_cf1 and the second control information Inf_cf2 according to the related first and second processing may be synchronized.

With reference to the transmission of signals relating to update requests and instructions between functional blocks, the first slave update issue signal Slave1_update_issue_2 and the first slave update execution signal Slave1_Update_Commit may be transmitted through local signal lines connecting the master IP block FB2 and the first slave IP block FB1.

Figure 10:
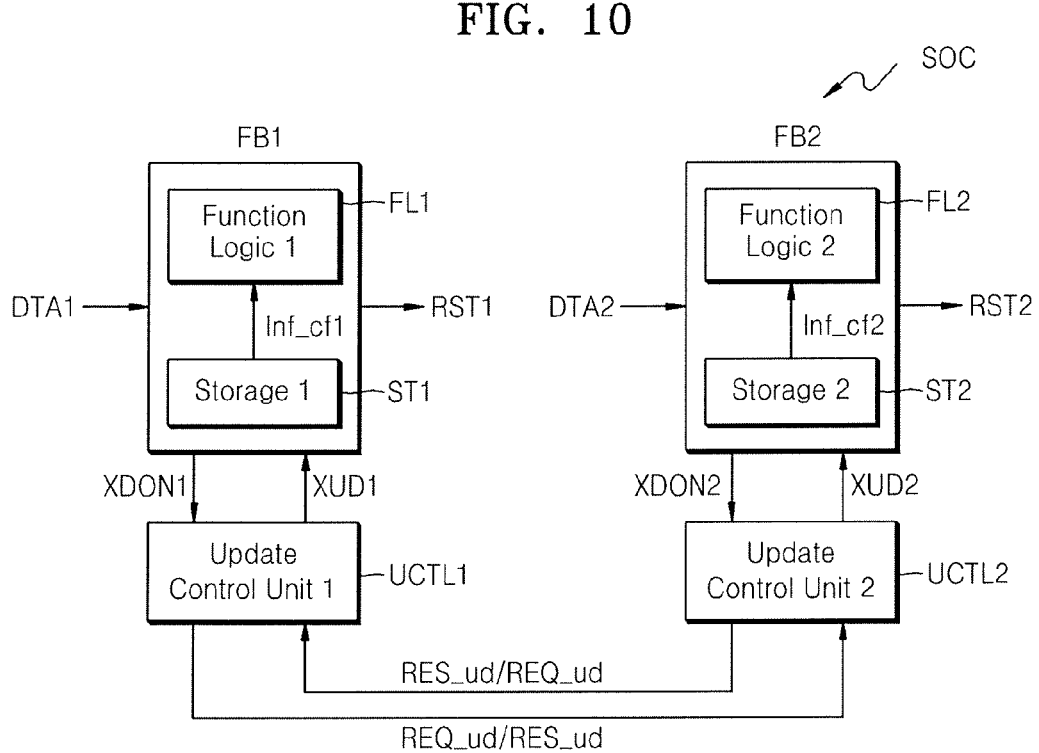
FIG. 10 is a diagram of an example of signals between a first functional block and a second functional block used to control the updating of control information in the SoC of FIG. 1, according to an exemplary embodiment of the present inventive concept.

FIG. 10 is a diagram of an example of signals between the first functional block FB1 and the second functional block FB2 used to control the updating of control information in the SoC of FIG. 1, according to an exemplary embodiment of the present inventive concept.

Referring to FIG. 10, unlike the SoC of FIG. 1, the first update control unit UCTL1 of the SoC may receive the update instruction request REQ_ud, and the second update control unit UCTL2 may receive the update instruction response RES_ud. That is, in FIG. 1, only the second update control unit UCTL2 of the SoC may control an update operation of the first update control unit UCTL1, whereas in FIG. 10, both the first update control unit UCTL1 and the second update control unit UCTL2 of the SoC may control update operations of other update control units. In this regard, a more detailed example is described with reference to FIG. 11.

Figure 11:
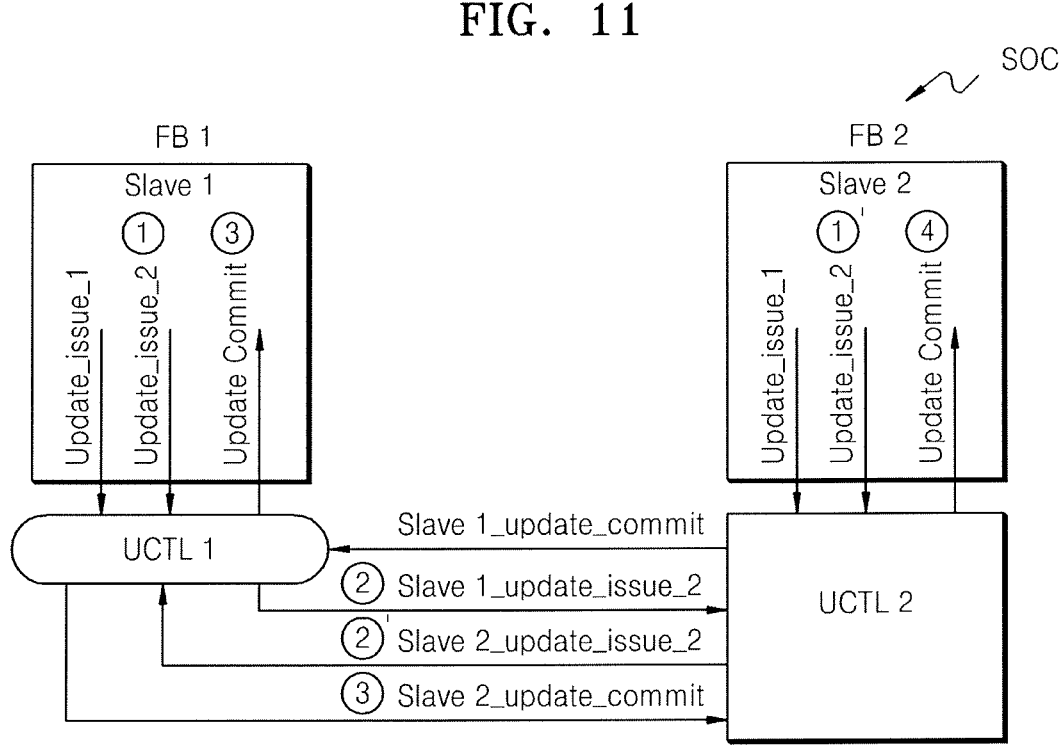
FIG. 11 is a signal flow diagram showing signals used to update control information in the SoC of FIG. 1, according to an exemplary embodiment of the present inventive concept.

FIG. 11 is a signal flow diagram showing signals used to update control information in the SoC of FIG. 10, according to an exemplary embodiment of the present inventive concept.

Referring to FIGS. 10 and 11, the first slave IP block FB1 and the second slave IP block FB2 of FIG. 11 may be the first functional block FB1 and the second functional block FB2 of FIG. 10, respectively. That is, the first slave IP block FB1 and the second slave IP block FB2 may be respectively used as the first functional block FB1 and the second functional block FB2 of FIG. 10.

The first slave IP block FB1 and the second slave IP block FB2 may perform first processing and second processing on the first data DTA1 and the second data DTA2, respectively. The first slave IP block FB1 and the second slave IP block FB2 do not transmit or receive the first processing result RST1 and the second processing result RST2 to or from each other. As described above, a slave IP block may transmit a processing result to a master IP block.

However, when the first processing result RST1 and the second processing result RST2 are related to each other, for example, when the first processing result RST1 and the second processing result RST2 are processed in a pair (e.g., firstly processing 3D image data at an angle of a user's left eye (processing adaptive to a left eye) and secondly processing the 3D image data at an angle of a user's right eye (processing adaptive to a right eye) in processing of 3D image data), updating of the first control information Inf_cf1 and updating of the second control information Inf_cf2 respectively by the first processing result RST1 and the second processing result RST2 should be synchronized. When the updating of the first control information Inf_cf1 and the updating of the second control information Inf_cf2 are not synchronized, data (e.g., the first processing result RST1) for the user's left eye and data (e.g., the second processing result RST2) for the user's right eye are processed at different times, and thus the data may not be formed as proper 3D data.

In an exemplary embodiment, to synchronize the updating of the first control information Inf_cf1 and the updating of the second control information Inf_cf2 between slave IP blocks, the first update control unit UCTL1 and the second update control unit UCTL2 may receive the second update issue signal Update_issue_2 (②), and then transmit the first slave update issue signal Slave1_update_issue_2 or a second slave update issue signal Slave2_update_issue_2 to each other (③). An update control unit selected from among the first update control unit UCTL1 and the second update control unit UCTL2 may instruct that control information of a slave IP block including the selected update control unit and another update control unit be updated. The other update control unit may receive an update instruction signal from the selected update control unit, and update the control information of the slave IP block including the selected update control. For example, an update control unit that is relatively fast in terms of response speed with respect to an update issue signal, or that corresponds to a slave IP block having a relatively high amount of resources, may be selected from among the first update control unit UCTL1 and the second update control unit UCTL2.

FIG. 11 shows an example in which the first update control unit UCTL1 is selected, the update execution signal Update_Commit is transmitted to the first slave IP block FB1, updating of the first control information Inf_cf1 is instructed (②), and the second slave update execution signal Slave2_Update_Commit is transmitted to the second update control unit UCTL2 (③). In this case, the second update control unit UCTL2 instructs the second slave IP block FB2 to update the second control information Inf_cf2 in response to the second slave update execution signal Slave2_Update_Commit. In FIG. 11, the first slave IP block FB1 and the second slave IP block FB2 may control the updating of update information thereof when transmitting and receiving an update instruction to and from each other.

Figure 12:
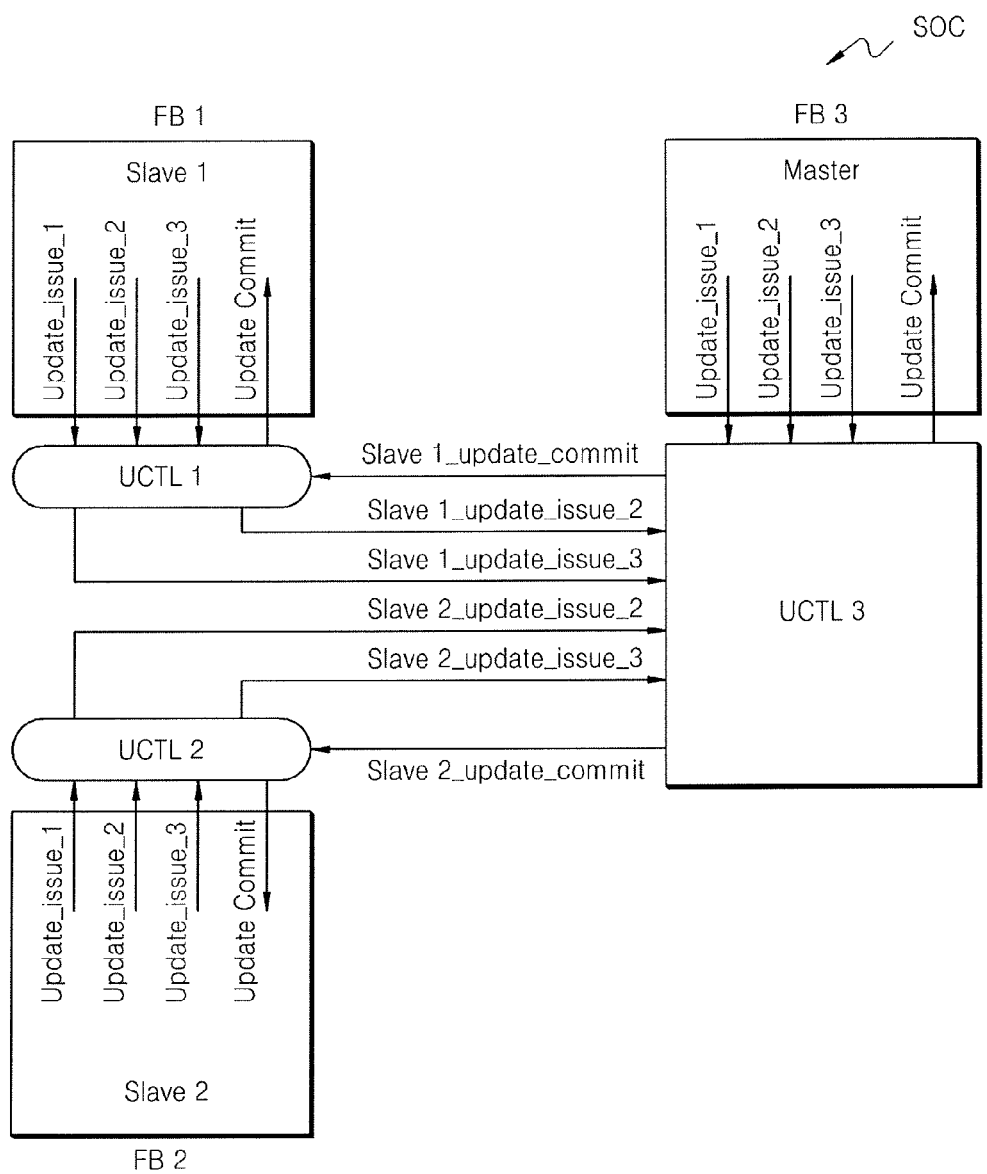
FIG. 12 is a diagram of an example of signals used to control the updating of control information in the SoC of FIG. 3, according to an exemplary embodiment of the present inventive concept.

FIG. 12 is a signal flow diagram showing signals used to control the updating of control information in the SoC of FIG. 3, according to an exemplary embodiment of the present inventive concept.

Referring to FIGS. 3 and 12, the first slave IP block FB1, the second slave IP block FB2, and a master IP block FB3 of FIG. 12 may respectively be the first functional block FB1, the second functional block FB2, and the third functional block FB3 of FIG. 3. That is, the first slave IP block FB1, the second slave IP block FB2, and the master IP block FB3 may respectively be used as the first functional block FB1, the second functional block FB2, and the third functional block FB3.

The first slave IP block FB1 and the second slave IP block FB2 may transmit the first processing result RST1 and the second processing result RST2 on the first data DTA1 and the second data DTA2, respectively, to the master IP block FB3. The master IP block FB3 may receive the first processing result RST1 and the second processing result RST2 as third data DTA3, and perform third processing on the third data DTA3.

Referring to FIGS. 3 and 12, the first update control unit UCTL1, the second update control unit UCTL2, and the third update control unit UCTL3 of FIG. 12 may be the first update control unit UCTL1, the second update control unit UCTL2, and the third update control unit UCTL3 of FIG. 3, respectively.

The first update control unit UCTL1, the second update control unit UCTL2, and the third update control unit UCTL3 may use the first update issue signal Update_issue_1, the second update issue signal Update_issue_2, a third update issue signal Update_issue_3, and the update execution signal Update_Commit that are transmitted or received to or from the first slave IP block FB1, the second slave IP block FB2, and the master IP block FB3, respectively, to control update times of the first control information Inf_cf1 of the first slave IP block FB1, the second control information Inf_cf2 of the second slave IP block FB2, and the third control information Inf_cf3 of the master IP block FB3. The first update issue signal Update_issue_1, the second update issue signal Update_issue_2, and the third update issue signal Update_issue_3 transmitted to the first update control unit UCTL1 are the first complete signals XDON1 of FIG. 3, and the update execution signal Update_Commit received by the first update control unit UCTL1 is the first update execution signal XUD1 of FIG. 3. The first update issue signal Update_issue_1, the second update issue signal Update_issue_2, and the third update issue signal Update_issue_3 transmitted to the second update control unit UCTL2 are the second complete signals XDON2 of FIG. 3, and the update execution signal Update_Commit received by the second update control unit UCTL2 is the second update execution signal XUD2 of FIG. 3. Similarly, the first update issue signal Update_issue_1, the second update issue signal Update_issue_2, and the third update issue signal Update_issue_3 transmitted to the third update control unit UCTL3 are third complete signals XDON3 of FIG. 3, and the update execution signal Update_Commit received by the third update control unit UCTL3 is a third update execution signal XUD3 of FIG. 3.

The first update issue signal Update_issue_1 of FIG. 12 may be a signal indicating completion of processing that affects only each IP block, the second update issue signal Update_issue_2 may be a signal indicating the completion of processing relating to each slave IP block, and the third update issue signal Update_issue_3 may be a signal indicating the completion of processing related to both slave IP blocks and the master IP block.

To control the update times of the first control information Inf_cf1 of the first slave IP block FB1, the second control information Inf_cf2 of the second slave IP block FB2, and the third control information Inf_cf3 of the master IP block FB3, the first update control unit UCTL1 and the third update control unit UCTL3 may transmit or receive the first slave update issue signal Slave1_update_issue_2 and the first slave update execution signal Slave1_Update_Commit to or from each other, and the second update control unit UCTL2 and the third update control unit UCTL3 may transmit or receive the second slave update issue signal Slave2_update_issue_2 and the second slave update execution signal Slave2_Update_Commit to or from each other. The first slave update issue signal Slave1_update_issue_2 transmitted from the first slave IP block FB1 to the master IP block FB3 may be the first update instruction request REQ_ud1 of FIG. 3. The first slave update execution signal Slave1_Update_Commit transmitted from the master IP block FB3 to the first slave IP block FB1 may be the first update instruction response RES_ud1 of FIG. 3. The first slave update issue signal Slave1_update_issue_2 transmitted from the second slave IP block FB2 to the master IP block FB3 may be the second update instruction request REQ_ud2 of FIG. 3. The first slave update execution signal Slave1_Update_Commit transmitted from the master IP block FB3 to the second slave IP block FB2 may be the second update instruction response RES_ud2 of FIG. 3.

Although signals are shown as being transmitted or received to and from IP blocks through separate lines in FIG. 12, exemplary embodiments are not limited thereto. For example, in exemplary embodiments, the signals may be transmitted or received to and from IP blocks through a single line.

Figure 13:
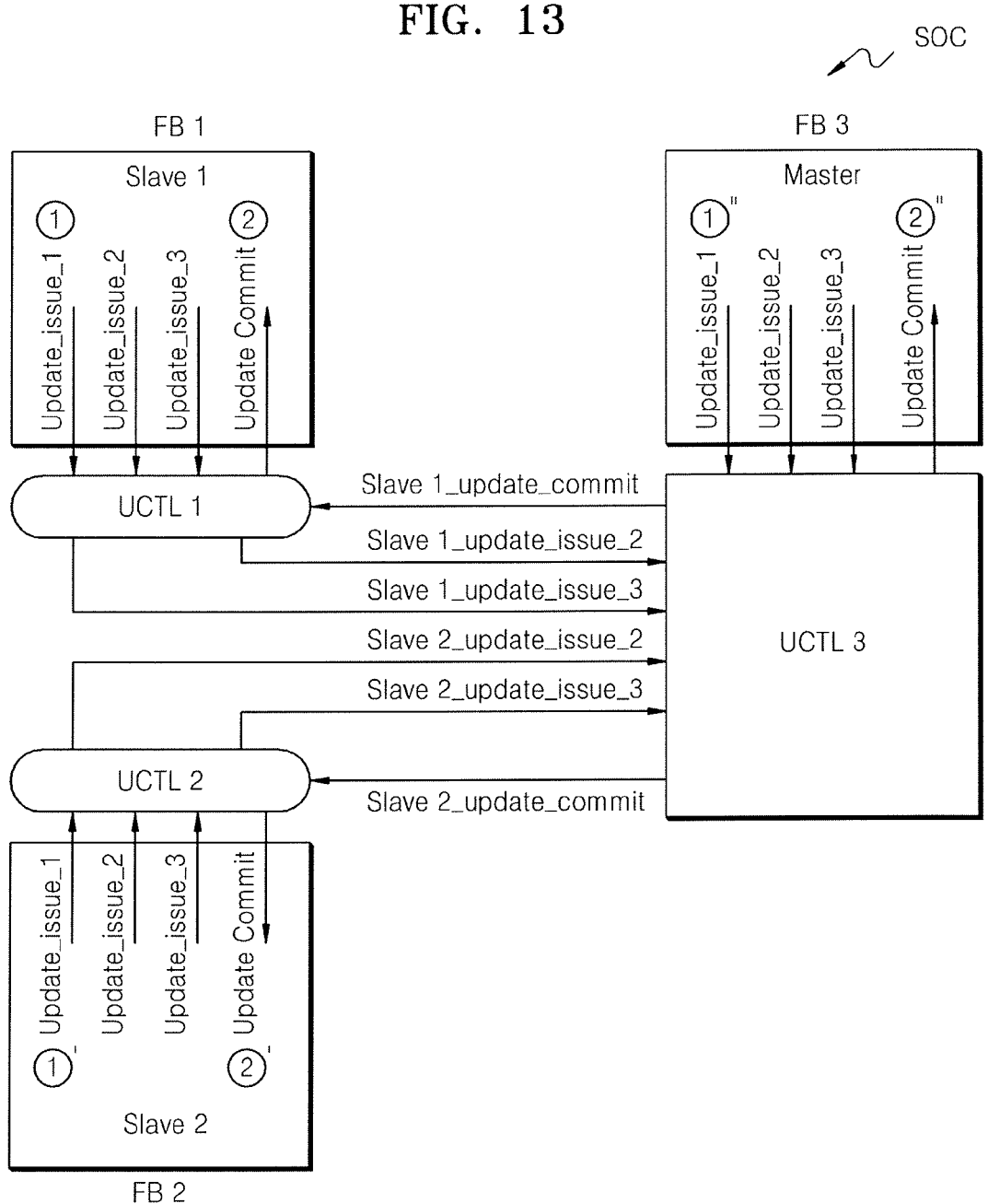
FIGS. 13 and 14 are signal flow diagrams showing signals of FIG. 12, according to exemplary embodiments of the present inventive concept.
Figure 14:
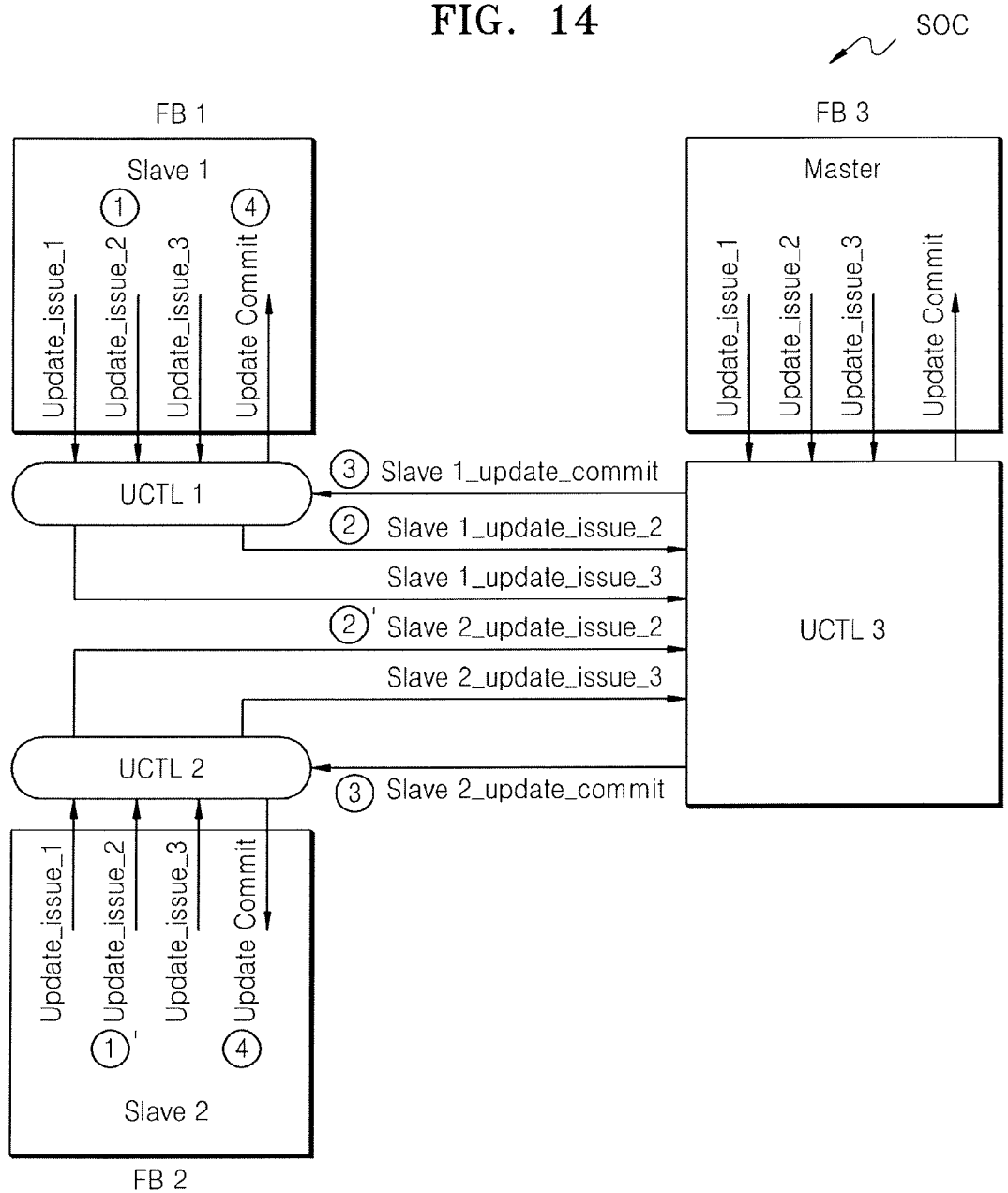

FIGS. 13 and 14 are signal flow diagrams showing signals of FIG. 12, according to exemplary embodiments of the present inventive concept.

Referring to FIGS. 3 and 13, when first processing on the first data DTA1 and second processing on the second data DTA2 of the first slave IP block FB1 and the second slave IP block FB2 respectively affect only the first slave IP block FB1 and the second slave IP block FB2, and do not affect a counterpart slave IP block and the master IP block FB3, as shown in FIG. 8, control information of a corresponding IP block is updated irrespective of another update control unit.

For example, in FIG. 13, the first update control unit UCTL1 may not communicate with the second update control unit UCTL2 and the third update control unit UCTL3, but may update the first control information Inf_cf1 stored in the first storage unit ST1. The second update control unit UCTL2 may not communicate with the first update control unit UCTL1 and the third update control unit UCTL3, but may update the second control information Inf_cf2 stored in the second storage unit ST2. The third update control unit UCTL3 may not communicate with the first update control unit UCTL1 and the second update control unit UCTL2, but may update the third control information Inf_cf3 stored in the third storage unit ST3.

For example, when the first update control unit UCTL1 receives the first update issue signal Update_issue_1 from the first slave IP block FB1 (①), the first update control unit UCTL1 may transmit the update execution signal Update_Commit instructing the first slave IP block FB1 (②) to update the first control information Inf_cf1. When the second update control unit UCTL2 receives the first update issue signal Update_issue_1 from the second slave IP block FB2 (①'), the second update control unit UCTL2 may transmit the update execution signal Update_Commit instructing the second slave IP block FB2 (②') to update the second control information Inf_cf2. When the third update control unit UCTL3 receives the first update issue signal Update_issue_1 from the third slave IP block FB3 (①''), the third update control unit UCTL3 may transmit the update execution signal Update_Commit instructing the third slave IP block FB3 (②'') to update the third control information Inf_cf3.

Figure 15:
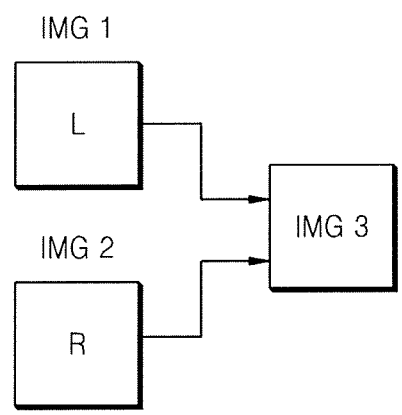
FIG. 15 is a diagram of an exemplary implementation of the flow of signals shown in FIG. 14, according to an exemplary embodiment of the present inventive concept.

Referring to FIGS. 3 and 14, when the first processing on the first data DTA1 of the first slave IP block FB1 and the second processing on the second data DTA2 of the second slave IP block FB2 are related to each other, for example, when the first processing and the second processing are processed in a pair (e.g., firstly processing one piece of image data at an angle of a user's left eye (IMG1) and secondly processing the image data at an angle of a user's right eye (IMG2), as shown in FIG. 15), the first update control unit UCTL1 and the second update control unit UCTL2 may update the first control information Inf_cf1 stored in the first storage unit ST1 and the second control information Inf_cf2 stored in the second storage unit ST2 under the control of the third update control unit UCTL3, so that updating of the first control information Inf_cf1 and updating of the second control information Inf_cf2 may be synchronized.

For example, when the first update control unit UCTL1 receives the second update issue signal Update_issue_2 from the first slave IP block FB1 (②), the first update control unit UCTL1 may transmit the first slave update issue signal Slave1_update_issue_2 (②) instructing the third update control unit UCTL3 to update the first control information Inf_cf1. Similarly, when the second update control unit UCTL2 receives the second update issue signal Update_issue_2 from the second slave IP block FB2 (②'), the second update control unit UCTL2 may transmit the second slave update issue signal Slave2_update_issue_2 (②') instructing the third update control unit UCTL3 to update the second control information Inf_cf2.

When the third update control unit UCTL3 receives the first slave update issue signal Slave1_update_issue_2 and the second slave update issue signal Slave2_update_issue_2, the third update control unit UCTL3 may transmit the first slave update execution signal Slave1_Update_Commit (③) and the second slave update execution signal Slave2_Update_Commit to the second update control unit UCTL2 (③). When the first update control unit UCTL1 receives the first slave update execution signal Slave1_Update_Commit from the third update control unit UCTL3 to instruct that the first control information Inf_cf1 (③) be updated, the first update control unit UCTL1 may transmit the update execution signal Update_Commit instructing the first slave IP block FB1 (④) to update the first control information Inf_cf1. When the second update control unit UCTL2 receives the second slave update execution signal Slave2_Update_Commit from the third update control unit UCTL3 to instruct that the second control information Inf_cf2 (③) be updated, the second update control unit UCTL2 may transmit the update execution signal Update_Commit instructing the second slave IP block FB2 (④) to update the second control information Inf_cf2.

Figure 16:
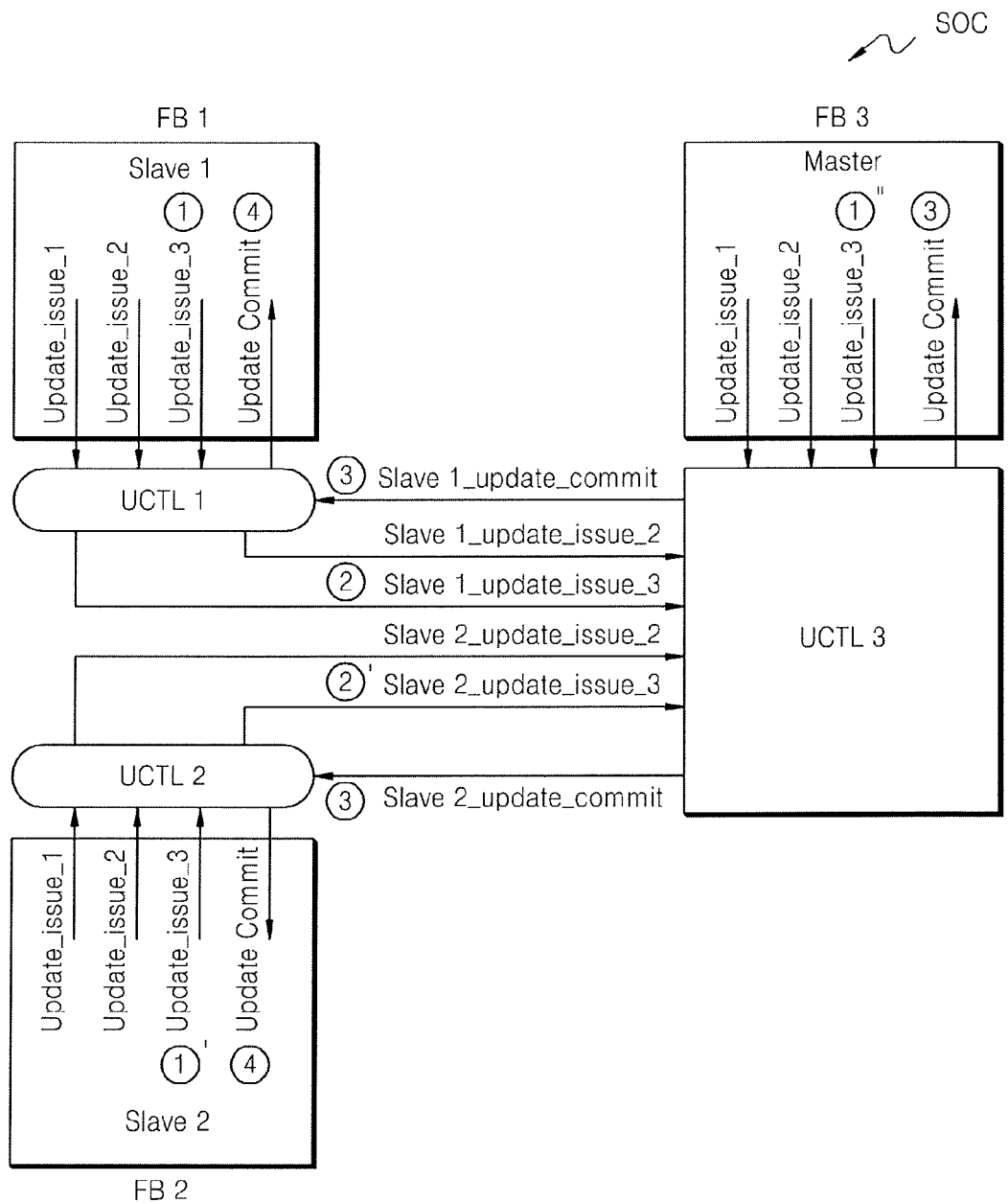
FIG. 16 is a signal flow diagram showing the signals of FIG. 12, according to an exemplary embodiment of the present inventive concept.

FIG. 16 is a signal flow diagram showing the signals of FIG. 12, according to an exemplary embodiment of the present inventive concept.

Referring to FIGS. 3 and 16, when first processing of the first data DTA1 of the first slave IP block FB1, second processing of the second data DTA2 of the second slave IP block FB2, and third processing of the third data DTA3 of the master IP block FB3 are correlated (e.g., when the master IP block FB3 receives the first processing result RST1 and the second processing result RST2, which were obtained by reducing sizes of the first image IMG1 and the second image IMG2 of FIG. 15 in which the first processing and the second processing are correlated to each other as described above), as the third data DTA3 performs the third processing, the first update control unit UCTL1, the second update control unit UCTL2, and the third update control unit UCTL3 may update corresponding control information under the control of the third update control unit UCTL3 so that the updating of the first control information Inf_cf1, the updating of the second control information Inf_cf2, and the updating of the third control information Inf_cf3 may be synchronized.

For example, when the first update control unit UCTL1 receives the third update issue signal Update_issue_3 from the first slave IP block FB1 (①), the first update control unit UCTL1 may transmit the first slave update issue signal Slave1_update_issue_2 to the third update control unit UCTL3 (②) to instruct to update the first control information Inf_cf1. When the second update control unit UCTL2 receives the third update issue signal Update_issue_3 from the second slave IP block FB2 (①'), the second update control unit UCTL2 may transmit the second slave update issue signal Slave2_update_issue2 to the third update control unit UCTL3 (②') to instruct to update the second control information Inf_cf2.

When the third update control unit UCTL3 receives the third update issue signal Update_issue_3 indicating completion of the third processing from the master IP block FB3 (①'), receives the first slave update issue signal Slave1_update_issue_2 from the first update control unit UCTL1 (②), and receives the second slave update issue signal Slave2_update_issue_2 from the second update control unit UCTL2 (②'), the third update control unit UCTL3 may transmit the update execution signal Update_Commit instructing that the third control information Inf_cf3 (③) be updated, transmit the first slave update execution signal Slave1_Update_Commit to the first update control unit UCTL1 (③), and transmit the second slave update execution signal Slave2_Update_Commit to the second update control unit UCTL2 (③). When the first update control unit UCTL1 receives the first slave update execution signal Slave1_Update_Commit from the third update control unit UCTL3 to instruct that the first control information Inf_cf1 (③) be updated, the first update control unit UCTL1 may transmit the update execution signal Update_Commit instructing the first slave IP block FB1 (④) to update the first control information Inf_cf1. Similarly, when the second update control unit UCTL2 receives the second slave update execution signal Slave2_Update_Commit from the third update control unit UCTL3 to instruct that the second control information Inf_cf2 (③) be updated, the second update control unit UCTL2 may transmit the update execution signal Update_Commit instructing the second slave IP block FB2 (④) to update the second control information Inf_cf2.

Figure 17:
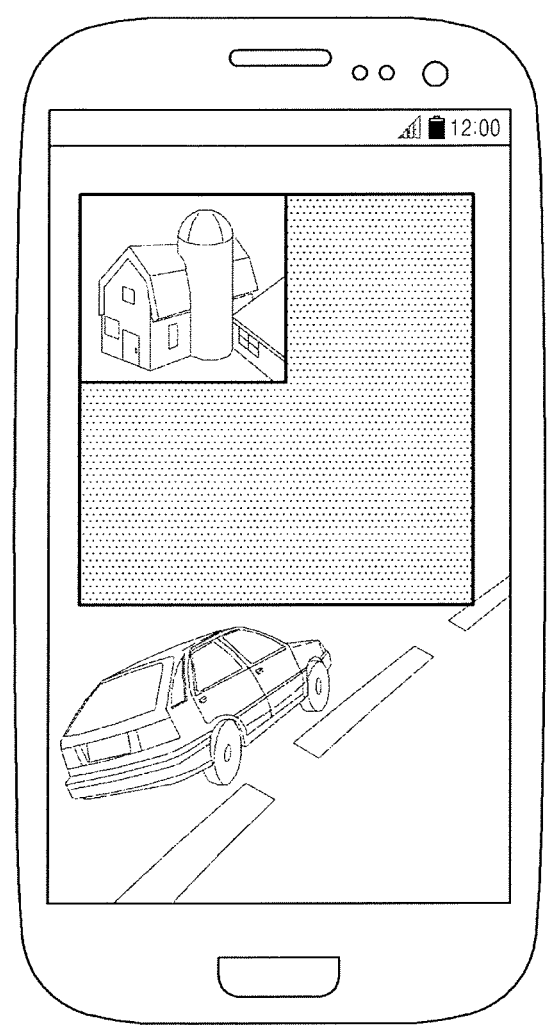
FIG. 17 illustrates a mobile device in which an image change is not provided to a user in real-time.

According to the above-described operations, the SoC according to exemplary embodiments may prevent an image change from not being provided to a user in real-time as the result of the updating of control information stored in the storage unit of each IP block regarding a size reduction not being synchronized, as shown in FIG. 17.

Figure 18:
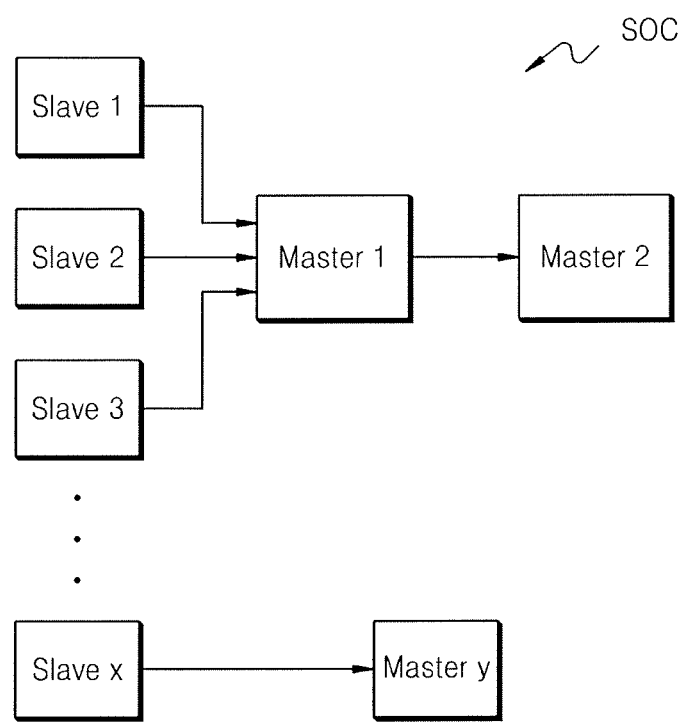
FIG. 18 is a diagram illustrating functional blocks of the SoC of FIG. 1, according to an exemplary embodiment of the present inventive concept.

FIG. 18 is a diagram illustrating functional blocks of the SoC of FIG. 1, according to an exemplary embodiment of the present inventive concept.

Referring to FIG. 18, the SoC according to an exemplary embodiment may include a plurality of slave IP blocks and a plurality of master IP blocks. Some of the plurality of slave IP blocks may share the same master IP block and may serve as slave IP blocks with respect to a higher-level master IP block. For example, first through third slave IP blocks may provide data (e.g., a processing result) to a first master IP block, and the first master IP block may provide the data (e.g., the processing result) to a second master IP block.

When the first master IP block is the master IP block FB3 of FIG. 12, the first master IP block may transmit an update instruction request to the second master IP block in response to update instruction requests from the slave IP blocks. When the second master IP block receives the update instruction request from the first master IP block, the second master IP block may perform the updating operation by transmitting an update instruction response to the first master IP block. The first master IP block that receives the update instruction response from the second master IP block may transmit update instruction responses to the slave IP blocks. Each of the slave IP blocks that receive the update instruction responses may update corresponding control information.

Although the IP blocks control the updating in FIG. 18, rather than the update control units, exemplary embodiments are not limited thereto. For example, the updating of control information may be controlled by a corresponding update control unit located inside or outside of each IP block.

Figure 19:
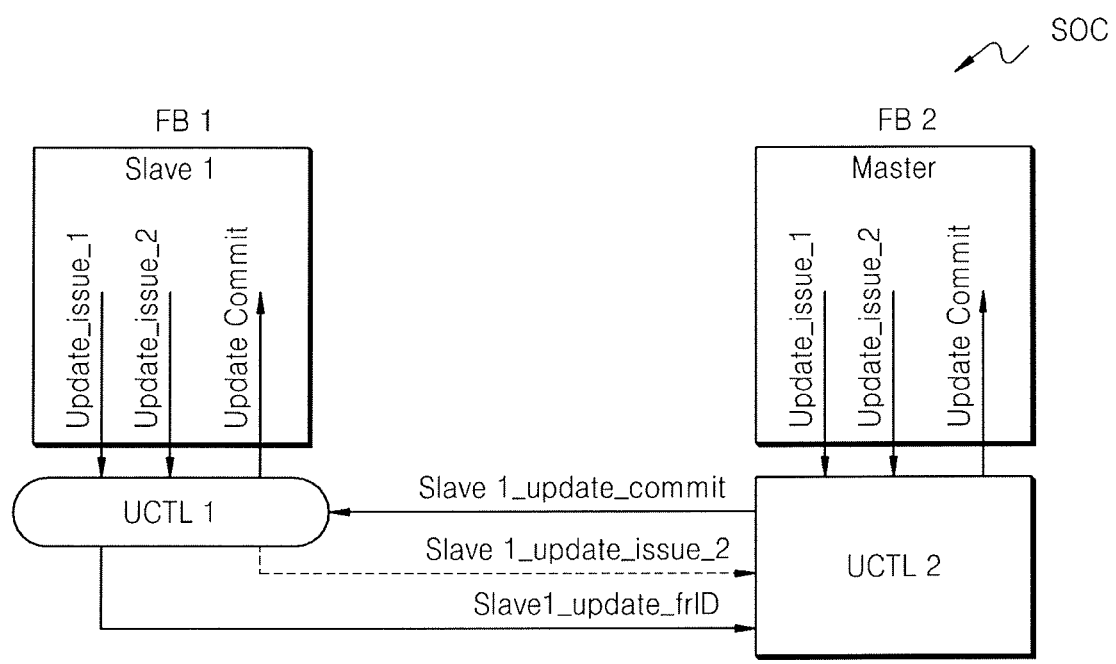
FIG. 19 is a signal flow diagram showing signals used to update control information when the control information is updated in a frame unit in the SoC of FIG. 1, according to an exemplary embodiment of the present inventive concept.

FIG. 19 is a signal flow diagram showing signals used to update control information when the control information is updated in a frame unit in the SoC of FIG. 1, according to an exemplary embodiment of the present inventive concept. Referring to FIGS. 1 and 19, the SoC of FIG. 19 may be, for example, a multimedia apparatus that processes image data, as described above. In this case, the first functional block FB1 and the second functional block FB2 may respectively firstly and secondly process data in the frame unit. The first functional block FB1 and the second functional block FB2 may update the control information in the frame unit.

Thus, when first processing and second processing are correlated to each other, the first update control unit UCTL1 may transmit an update instruction request Slave1_update_frID in the frame unit to the second update control unit UCTL2. However, according to a user selection or the control of the processor (see FIG. 6), the update instruction request REQ_ud in the frame unit and the update instruction request REQ_ud in a data unit may be selectively performed.

Figure 20:
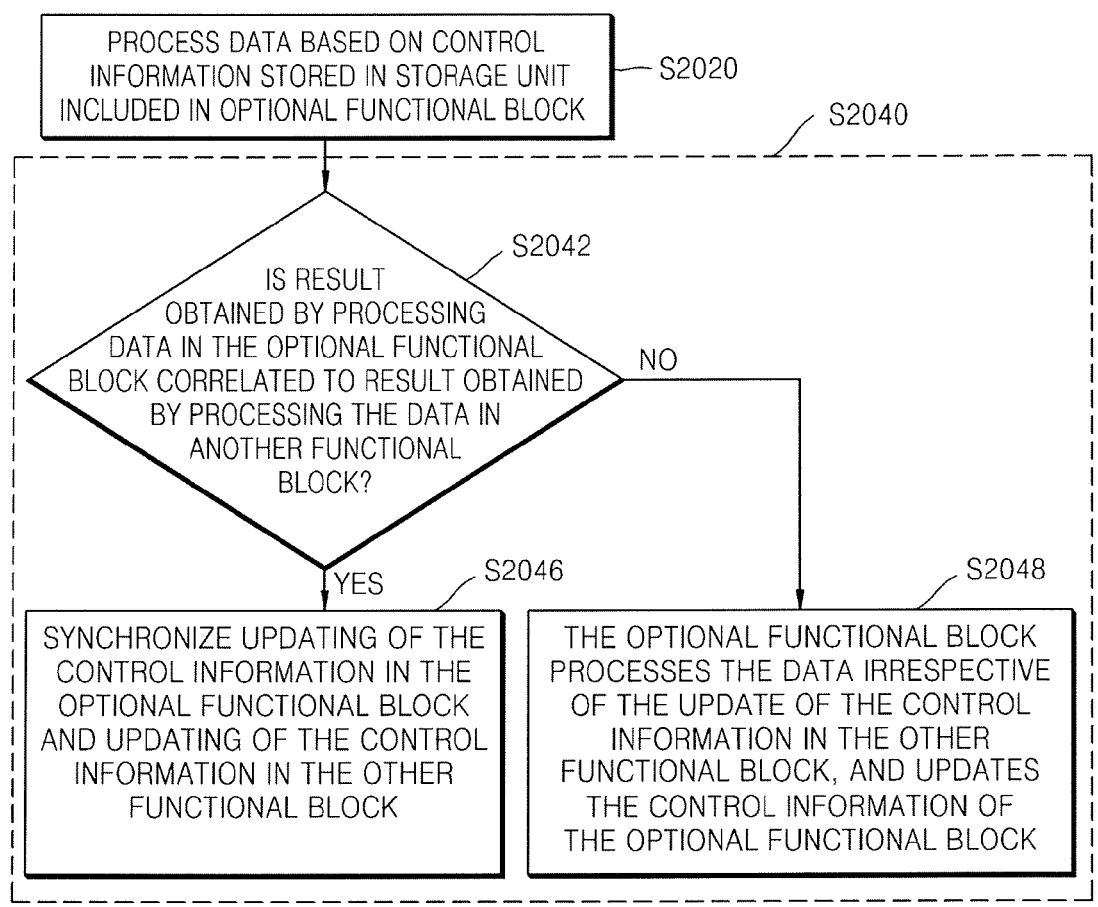
FIG. 20 is a flowchart of a method of operating an SoC, according to an exemplary embodiment of the present inventive concept.

FIG. 20 is a flowchart of a method of operating an SoC, according to an exemplary embodiment of the present inventive concept.

Referring to FIG. 20, the method of operating an SoC according to an exemplary embodiment includes an operation S2020 of an optional functional block processing data based on control information stored in a storage unit included in the optional functional block, and an operation S2040 of the optional functional block updating control information according to a result obtained by processing the data. The operation S2040 of updating the control information includes an operation S2042 of determining whether the result obtained by processing the data in the optional functional block is correlated to a result obtained by processing the data in another functional block. If it is determined that the result obtained by processing the data in the optional functional block is correlated to the result obtained by processing the data in the other functional block, an operation S2046 of synchronizing the updating of the control information in the optional functional block and the updating of the control information in the other functional block is performed.

Figure 21:
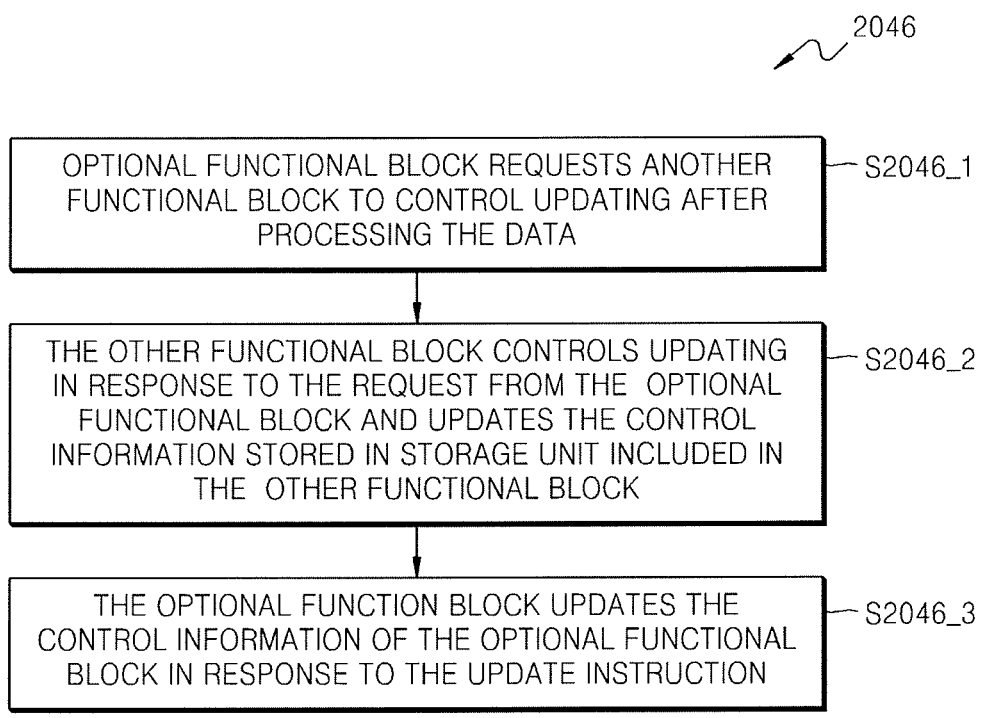
FIG. 21 is a flowchart of an operation of updating control information of FIG. 20, according to an exemplary embodiment of the present inventive concept.

In this regard, the operation S2046 of synchronizing the updating of the control information in the optional functional block and the updating of the control information in the other functional block may include, for example, an operation S2046_1 of the optional functional block requesting control of updating from the other functional block after processing the data, as shown in FIG. 21. Further included may be an operation S2046_2 of another functional block instructing the updating in response to the request from the optional functional block, and updating the control information stored in a storage unit included in the other functional block. Further included may be an operation S2046_3 of the optional function block updating the control information of the optional functional block in response to the update instruction.

Referring again to FIG. 20, at operation S2042, if it is determined that the result obtained by processing the data in the optional functional block is not correlated to the result obtained by processing the data in the other functional block, an operation S2048 of the optional functional block processing the data, irrespective of the updating of the control information in the other functional block, and updating the control information of the optional functional block, is performed.

Exemplary embodiments of the present inventive concept may be implemented in various forms of hardware, software, firmware, special purpose processors, or a combination thereof. In an exemplary embodiment, the present inventive concept may be implemented in software as an application program tangibly embodied on a program storage device (e.g., a computer readable medium).

While the present inventive concept has been particularly shown and described with reference to exemplary embodiments thereof, it will be understood that various changes in form and detail may be made therein without departing from the spirit and scope of the present inventive concept as defined by the following claims.

What is claimed is:

1. A system-on-chip (SoC), comprising:
a first slave intellectual property (IP) block configured to perform first processing on first data based on first control information stored in a first storage unit of the first slave IP block;
a master IP block configured to perform second processing on second data in response to receiving a first processing result obtained by performing the first processing on the first data, wherein performing the second processing is based on second control information stored in a second storage unit of the master IP block; and
an update control unit configured to determine an update time of the first control information stored in the first storage unit or an update time of the second control information stored in the second storage unit, in response to performing the first processing on the first data and performing the second processing on the second data.

2. The SoC of claim 1, wherein the update control unit comprises:
a first slave update control unit configured to determine the update time of the first control information stored in the first storage unit of the first slave IP block; and
a master update control unit configured to determine the update time of the second control information stored in the second storage unit of the master IP block.

3. The SoC of claim 2, wherein the first slave update control unit is disposed in the first slave IP block, and the master update control unit is disposed in the master IP block.

4. The SoC of claim 2, wherein determining the update time of the first control information is based on a property of the first data.

5. The SoC of claim 2, wherein the first slave update control unit is configured to update the first control information stored in the first storage unit after performing the first processing on the first data, and the first slave update control unit is not controlled by the master update control unit while the first processing result does not affect the master IP block.

6. The SoC of claim 2, further comprising:
a second slave IP block comprising a second slave update control unit,
wherein the first and second slave update control units are configured to concurrently update the first control information stored in the first storage unit when the first control information is updated in response to receiving an update instruction from the master update control unit.

7. The SoC of claim 2, wherein the first slave update control unit is configured to transmit a request to the master update control unit to control the update time of the first control information stored in the first storage unit, and to update the first control information in response to receiving an update instruction from the master update control unit, and
the master update control unit is configured to perform the second processing, and subsequently update the second control information at substantially a same time as transmitting the update instruction to the first slave update control unit.

8. The SoC of claim 2, further comprising:
a second slave IP block comprising a second slave update control unit,
wherein the first and second slave update control units are each configured to transmit a request to the master update control unit to control updating the first control information stored in the first storage unit subsequent to performing the first processing, and to concurrently update the first control information stored in the first storage unit when the first control information is updated in response to receiving an update instruction from the master update control unit,
wherein the master update control unit is configured to perform the second processing, and subsequently update the second control information at substantially a same time as transmitting the update instruction to each of the first and second slave IP blocks.

9. The SoC of claim 2, wherein the first slave update control unit is configured to transmit a request to the master update control unit to control updating the first control information upon performing the second processing of the second data.

10. The SoC of claim 1, wherein the update control unit is disposed outside of the first slave IP block and the master IP block.

11. The SoC of claim 1, wherein the first processing and the second processing are performed on a frame unit of image data processed in the SoC.

12. The SoC of claim 1, wherein the first processing and the second processing are performed asynchronously by the first slave IP block and the master IP block, respectively.

13. The SoC of claim 1, when the SoC is a multimedia apparatus, the first and second data form a 3-dimensional (3D) image, and the multimedia apparatus is configured to process and display the 3D image.

14. A method of operating a system-on-chip (SoC), comprising:
performing first processing on first data, by a slave intellectual property (IP) block, based on first control information stored in a first storage unit of the slave IP block;
performing second processing on second data, by a master IP block, in response to receiving a first processing result obtained by performing the first processing on the first data, wherein performing the second processing is based on second control information stored in a second storage unit of the master IP block; and
determining an update time of the first control information or an update time of the second control information in response to performing the first processing on the first data and performing the second processing on the second data.

* * * * *